United States Patent [19]
Lobb et al.

[11] Patent Number: 5,261,474
[45] Date of Patent: Nov. 16, 1993

[54] EARTHMOVER TIRE

[75] Inventors: Jolan F. Lobb, North Canton; Michael W. Cook, Canton, both of Ohio

[73] Assignee: The Goodyear Tire & Rubber Company, Akron, Ohio

[21] Appl. No.: 999,255

[22] Filed: Dec. 31, 1992

[51] Int. Cl.$^5$ .......................... B60C 3/00; B60C 11/01
[52] U.S. Cl. .................... 152/454; 152/538; 152/555
[58] Field of Search ............... 152/454, 209 R, 209 B, 152/555, 539, 538

[56] References Cited

U.S. PATENT DOCUMENTS

| | | |
|---|---|---|
| 2,626,649 | 1/1953 | Eiler et al. ................. 152/209 B |
| 3,244,213 | 4/1966 | McMannis . |
| 3,542,107 | 11/1970 | Mills et al. . |
| 3,703,203 | 11/1972 | Simpson .................. 152/555 X |
| 4,147,751 | 4/1979 | Duderstadt et al. . |
| 4,155,392 | 5/1979 | Duderstadt et al. . |
| 4,282,918 | 8/1981 | Tomoda et al. . |
| 4,445,560 | 5/1984 | Musy . |
| 4,534,392 | 8/1985 | Bonko et al. ............. 152/209 B |
| 4,813,467 | 3/1989 | Hinkel et al. . |

FOREIGN PATENT DOCUMENTS 1908257 9/1969 Fed. Rep. of Germany ... 152/209 B

Primary Examiner—Michael W. Ball
Assistant Examiner—Adrienne C. Johnstone
Attorney, Agent, or Firm—David L. King

[57] ABSTRACT

A molded shape for an earthmover tire 20 is disclosed. The uninflated, unmounted outer shape tire's sidewalls 22 are composed entirely of curves connected at tangency points between the tread 24 and the bead flange area 26. The shape transitions smoothly from one curve to the next without any flat surfaces. The sidewalls 22 have axially outer convex surfaces extending from the tread 24 to the bead flange area 26. The tread 24 has a radially outer ground contacting surface 28. A curved line tangent to the ground contacting surface 28 forms an arc having a single radius of curvature (TR). In a preferred embodiment of the invention, the outer shape consists of four curves with one curve describing the tread arc width (TAW), one curve $R_{us}$ describing the upper sidewall, one curve $R_{ls}$ describing the lower sidewall, and one curve describing the flange area radius $R_{fa}$.

6 Claims, 3 Drawing Sheets

EARTHMOVER TIRE

The invention relates to an as-molded shape for large pneumatic tires commonly known as earthmover pneumatic tires. The shape is particularly well suited for use on vehicles that see some road service as part of their duty cycle.

Earthmover tires are required to provide excellent tractive forces for very heavy vehicles. They are also expected to sometimes travel on the public highways as the vehicles travel from site to site. For some of these tires, the highway speeds can approach those of more conventional vehicles. The two distinct types of service, namely slow/extremely high load and fast/regular heavy load, require a very strong and stiff tire structure. In the past, structural strength was enhanced on these tires 10 through the incorporation of 'flats' 14A and 'bulges' 14B (complex non-tangent curves) into the molded shape of the exterior surfaces of the tire as illustrated in FIG. 1. These enhancements were considered to give extra support to typical durability problem areas, namely the lower sidewall (ls), mid-sidewall (ms) and tread center (tc).

Unfortunately, these discontinuities in the as-molded or uninflated and unmounted shape contribute to increased stresses in the tire casing. These stress-risers contribute to heat generation and production difficulties in these very large and heavy tires.

The present invention provides a shape which minimizes geometric stress risers by employing tangency transitions between the different curves along the tire sidewalls. An earthmover tire made according to the present invention can provide excellent durability and performance with minimal heat rise throughout its service life. Such a tire will also demonstrate excellent high speed characteristics.

RELATED ART

The closest related art to the present invention is the aircraft tire taught by U.S. Pat. No. 4,813,467, Radial Ply Aircraft Tire and Rim by Lobb, et al.

In the aircraft tire, however, there are certain key differences. First, the aircraft tire features a massive belt structure and, therefore, requires a "decoupling" concave curve in the shoulder region. There is no such curve reversal in the present invention.

The aircraft tire experiences much greater deflections than earthmover tires and, therefore, incorporates different but specific ratios between the various curved surfaces. For example, the aircraft tire requires a Rim Width Ratio (RWR) of 0.75 or greater; the preferred embodiment earthmover tire has a RWR of 0.65. The rim width ratio is defined as the axial distance between the rim flanges divided by the maximum section width. Also, the aircraft tire experiences much higher speeds during service. The combination of deflection and speed prevents the aircraft tire from utilizing a steel reinforcing ply and/or steel reinforcing belt(s). The present invention utilizes both. The aircraft tire is typically multi-ply construction having nylon or rayon cords noted for superior flexure fatigue characteristics, while the earthmover tire is exclusively a uni-ply steel reinforced structure.

The aircraft tire is designed for very high contained air pressures, exceeding 10 Bar. The earthmover tire sees contained air pressures from 7-9 Bar. Therefore, the aircraft tire requires a round cross-sectional shape to the bead, while the earthmover tire uses the conventional cross sectional hexagonal shape.

The aircraft tire flange area radius is defined to be two times the rim flange radius whereas the earthmover tire features a radius derived iteratively to provide a 0.08" (2 mm) to a 0.12" (3 mm) clearance with the rim flange.

The aircraft tire has a relatively thin ribbed tread which has a very high net-to-gross ratio, generally 75% or greater. An earthmover tire has a relatively thick lugged tread pattern having a net-to-gross ratio in the 40% to 60% range.

SUMMARY OF THE INVENTION

The uninflated unmounted shape for an pneumatic tire 20 is disclosed. The uninflated shape consists of radii blended tangentially at key locations. The improved earthmover pneumatic tire 20 has a nominal bead diameter of at least 50 cm (20.0 inches). The tire 20 has a carcass 21 having a pair of bead portions 23. Each bead portion 23 has one annular inextensible bead 42 and a bead flange area 26. The carcass 21 further includes a steel reinforced radial ply 34 extending between and wrapped about each bead 42. The ply 34 has a turn up end 35 extending axially and radially outwardly from each bead 42. The carcass also has a plurality of reinforcing belts 40 disposed radially outward of the reinforcing ply 34; a tread 24 disposed radially outwardly of the carcass 21; a pair of axially inner sidewalls 22A disposed between the ply 34 and the turn up end 35 and extending from the bead portion to the reinforcing belts; and an axially outer sidewall 22B extending radially inwardly from the tread along the axially outer surfaces of the carcass and an axially inner sidewall. The tread 24 has a net-to-gross ratio in the range of 40% to 60%. The sidewalls 22 extend radially inwardly from the tread 24 along the axially outer surfaces of the carcass 21 toward the beads 42.

The improved earthmover tire 20 in the uninflated and unmounted state is characterized by a tread 24 having a radially outer ground contacting surface 28, that has a continuous curvature in the axial direction, such curvature being defined by a radius or radii less than twice the nominal rim diameter. The sidewalls 22 have axially outer convex surfaces 33 extending from the tread 24 to the bead flange area 26, the convex curvature having a maximum radius or radii of curvature between the bead flange area 26 and the tread 24 of less than the nominal rim diameter. The tread 24 has axially outer convex surfaces 29 being an extension of the convex surface 33 of the sidewall 22.

In a preferred embodiment, the tread shape is defined by a single radius TR and the sidewall is defined by three radii: one for the upper sidewall $R_{us}$, from the shoulder to the RhoM line; one for the lower sidewall $R_{ls}$, from the RhoM line to the flange tangency; and one for the flange area $R_{fa}$, from the flange tangency to the bead area flat.

The tread radius TR is defined to parallel the belt main radii, the main belt radii being the belt radii at the equatorial plane, thus providing a uniform tread and undertread depth across the belt during load. This uniform depth can also be measured on the cut section of the embodiment.

The sidewall radii originate on the RhoM line and the RhoM line is defined as half way between the ply line bead pivot point P and the ply line centerline C and in the preferred embodiment tire RhoM is coincident with the radial height at the maximum section width. Thus, the tangency between these two curves is located at RhoM.

The flange radius $R_{fa}$ is defined to have no interference with the rim flange and is typically defined to allow a 2.5 mm clearance to the rim flange at the tangency point.

DEFINITIONS

Figure 1:
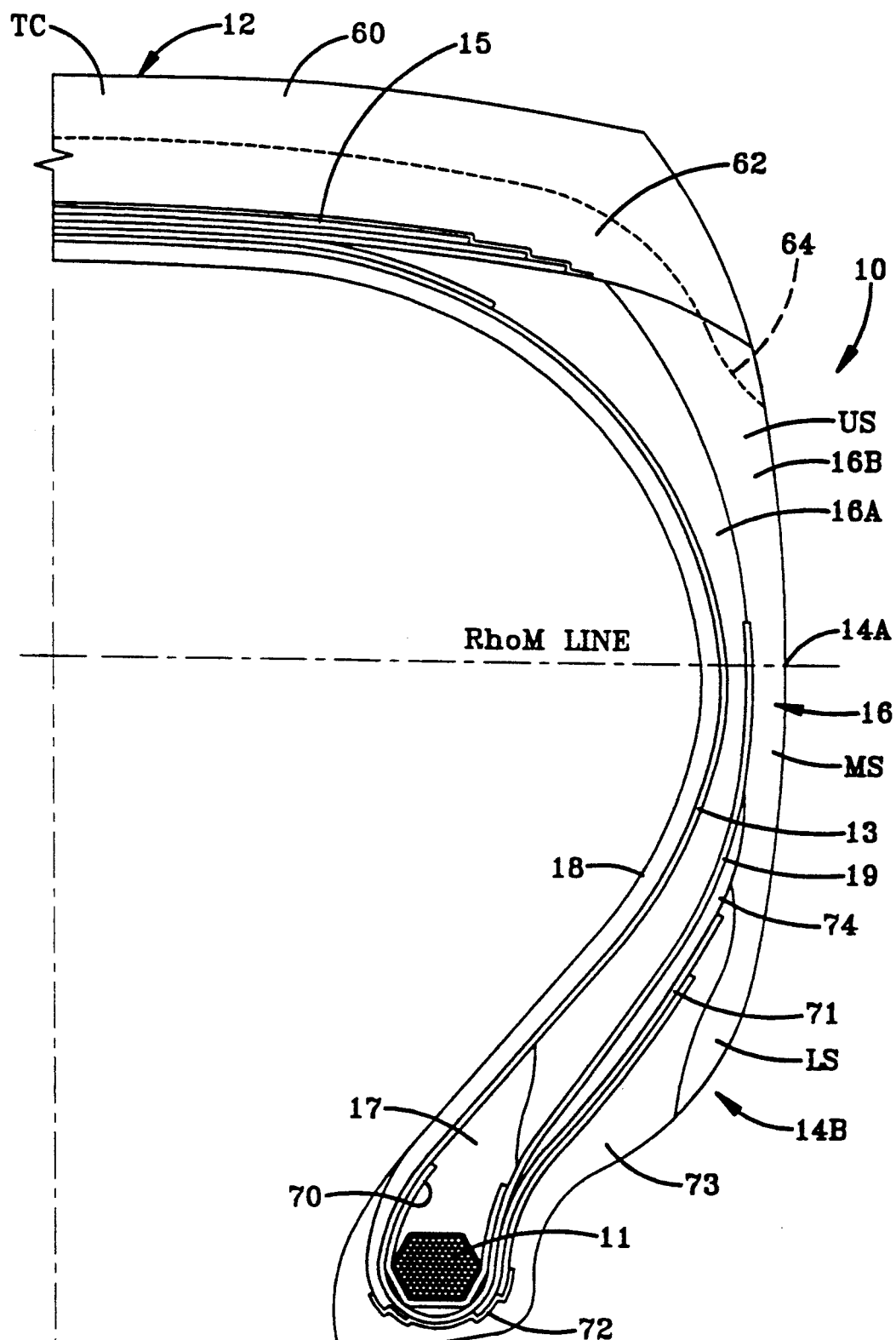
FIG. 1 is a cross-sectional view illustrating one side or half of a symmetrical prior art earthmover tire.

"Aspect ratio" of the tire means the ratio of its section height (SH) to its section width (SW);

"Axial" and "axially" means lines or directions that are parallel to the axis of rotation of the tire;

"Bead" means that part of the tire comprising an annular tensile member wrapped by ply cords and shaped, with or without other reinforcement elements such as flippers, chippers, apexes, toe guards and chafers, to fit the design rim;

"Belt reinforcing structure" means at least two layers of plies of parallel cords, woven or unwoven, underlying the tread, unanchored to the bead, and having both left and right cord angles in the range from 17 degrees to 27 degrees with respect to the equatorial plane of the tire;

"Carcass" means the tire structure apart from the belt structure, tread, undertread, and sidewall rubber over the plies, but including the beads;

"Circumferential" means lines or directions extending along the perimeter of the surface of the annular tread perpendicular to the axial direction;

"Chafers" refers to narrow strips of material placed around the outside of the bead to protect cord plies from the rim, distribute flexing above the rim, and to seal the tire;

"Chippers" mean a reinforcement structure located in the bead portion of the tire;

"Cord" means one of the reinforcement strands of which the plies in the tire are comprised;

"Equatorial plane (EP)" means the plane perpendicular to the tire's axis of rotation and passing through the center of its tread;

"Footprint" means the contact patch or area of contact of the tire tread with a flat surface at zero speed and under normal load and pressure;

"Innerliner" means the layer or layers of elastomer or other material that form the inside surface of a tubeless tire and that contain the inflating fluid within the tire;

"Net-to-gross ratio" means the ratio of the tire tread rubber that makes contact with the road surface while in the footprint, divided by the area of the tread in the footprint, including non-contacting portions such as grooves;

"Nominal rim diameter" means the average diameter of the rim flange at the location where the bead portion of the tire seats, the nominal rim diameter being equal to the nominal bead diameter of the tire;

"Normal inflation pressure" refers to the specific design inflation pressure and load assigned by the appropriate standards organization for the service condition for the tire;

"Normal load" refers to the specific design inflation pressure and load assigned by the appropriate standards organization for the service condition for the tire;

"Ply" means a continuous layer of rubber-coated parallel cords;

"Radial" and "radially" means directions radially toward or away from the axis of rotation of the tire;

"Radial-ply tire" means a belted or circumferentially-restricted pneumatic tire in which the ply cords which extend from bead to bead are laid at cord angles between 65° and 90° with respect to the equatorial plane of the tire;

"Section height" (SH) means the radial distance from the nominal rim diameter to the outer diameter of the tire at its equatorial plane; and

DETAILED DESCRIPTION OF THE INVENTION

With reference to FIG. 1, a cross-sectional view of a prior art earthmover tire 10 having the conventional shape and construction employed in earthmover tires is illustrated.

The tire 10 has a tread 12 disposed over the crown region of the tire carcass 14. The carcass 14 has a pair of inextensible annular beads 11. The illustrated beads 11 are of the hexagonal cross-sectional shape. Wrapped about the beads 11 is a single steel cord reinforced ply 13. Disposed radially outwardly of the ply 13 is a steel reinforced belt package consisting of at least four belts 15. A pair of sidewalls 16 extend between the tread and the bead area. Each sidewall 16 includes an axially inner and an axially outer portion 16A and 16B, respectively. Above the bead 11 is an elastomeric apex 17. Wrapped around the bead is a flipper 70. The flipper is adjacent the bead and the carcass ply. Outward of the ply turnup 19 is a pair of cord reinforced chippers 71. Outward of the ply and bead is a gum strip 72. Outward of the gum strip is a chaffer 73. The radially inner portion of the carcass includes an air impermeable inner liner 18.

The prior art tire 10 has a flat tread arc at the centerline (CL) of the tread in the area marked TC. The tread 12 includes plurality radially outer ground contacting lugs 60 and an inner tread 62. The inner tread includes a reverse curvature 64 at the location where the inner tread intersects the sidewall 16. At the Rhom line, the sidewall has a flat surface (MS). These characteristic flats and bulges as shown in the upper sidewall (US) near the tread and at the lower sidewall (LS) near the bead were provided to structurally increase the durability of the tire. At higher speeds, these areas are believed to create stress risers, generate excessive heat, and limit the speeds at which the vehicle can travel without damaging the tire.

Figure 2:
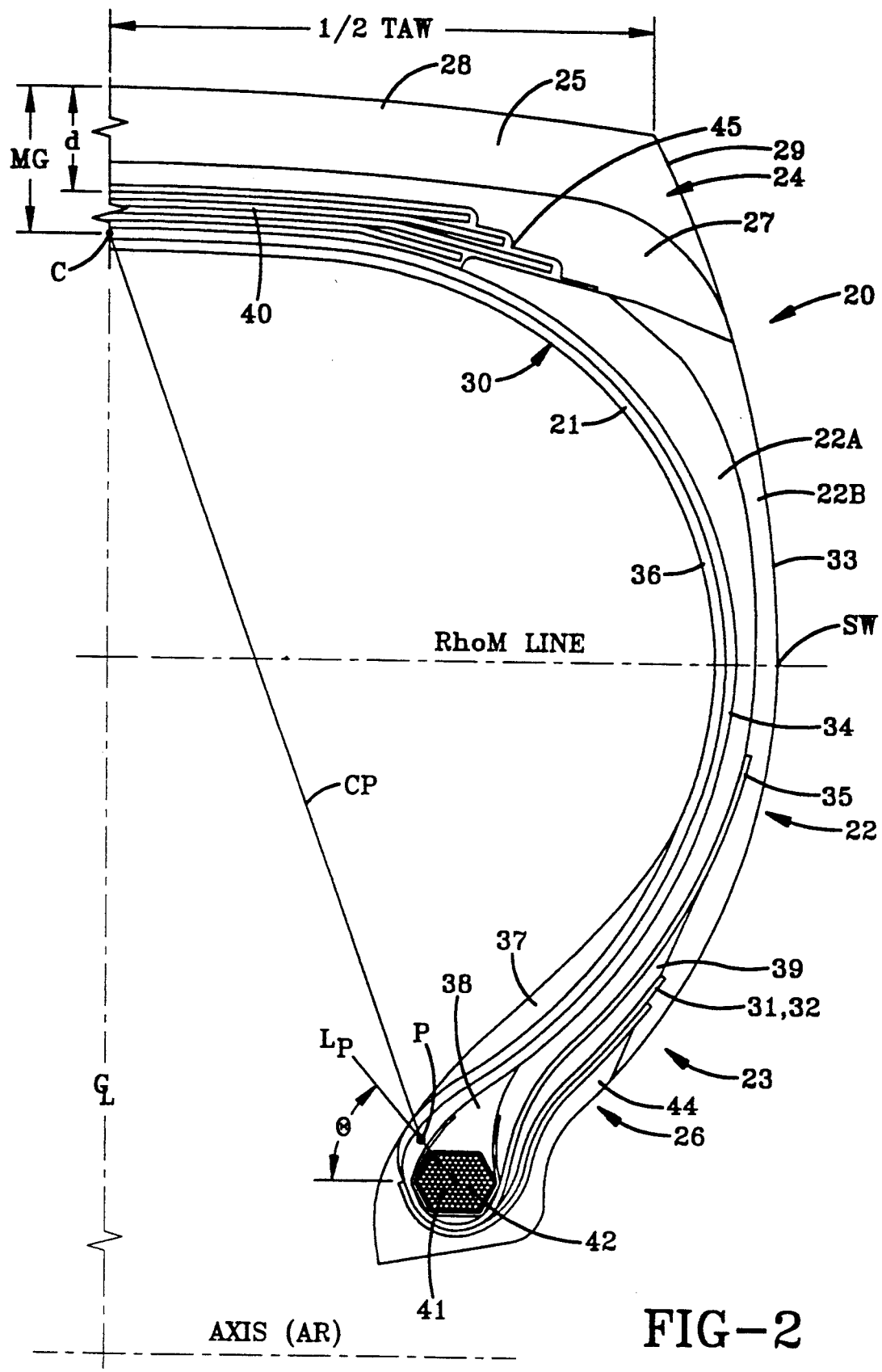
FIG. 2 is a cross-sectional view illustrating one side or half of a symmetrical tire made in accordance with the present invention.

With reference to FIG. 2, a cross sectional view of a preferred embodiment of the improved earthmover tire having the shape and construction according to the present invention is illustrated. FIG. 2 shows 445/95R25 type tire 20 according to the present invention. Larger tires would be similar in construction appearance, but may have additional belts and chippers.

The preferred embodiment earthmover tire 20 has a tread 24. The tread includes a plurality of lugs 25. The lugs 25 have a ground contacting surface 28 at the radially outermost surface of the lugs. The ground contacting surface 28 has an area in the range of 40% to 60% of the overall tread area, the area relationship is commonly referred to as the net-to-gross ratio. The tread 24 has a radially inner portion defined as an undertread 27. The tire 20 has a casing 30 inward of the tread 24. The casing 30 has a carcass 21 having a plurality of at least four steel reinforced belts 40 radially inward and adjacent to the undertread 27. The axially outer ends of the belt 40 are covered by a gum strip 45. Radially inward of the belts 40 is disposed a single steel cord reinforced ply 34 having a pair of turn up ends 35 which are each wrapped about an elastomeric gum strip commonly called a flipper 41 and a steel cabled hexagonal shaped bead 42. Radially inward of the ply 34 is an air impermeable inner liner 36. Adjacent to the inner liner is an elastomeric ply line insert 37. Radially above each bead is an elastomeric apex 38. Between the ply turn up 35 and a pair of chippers 31,32 is inserted an elastomeric wedge 39. Radially inward and axially outward of each of the beads 42 is a hard elastomeric component commonly called a chaffer 44. Disposed between the tread 24 and the beads 42 are a pair of sidewalls 22. The sidewalls 22 include an axially inner portion 22A disposed radially inward of and axially under the belt edges and between the ply 34 and the ply turn up 35, and an axially outer sidewall portion 22B disposed axially outward of the inner sidewall and outward and adjacent to the ply turn up end 35.

In the size illustrated, the preferred embodiment features two chippers 31,32, which may be composed of rubber with nylon or steel reinforcement. The single ply 34 is reinforced with steel and features a turn up ending 35 below the radial locating maximum section width SW of the preferred embodiment tire 20. The turn up may end 35 higher or lower than that shown in FIG. 2, but should parallel the ply line curve through most of the radially lower sidewall.

FIG. 2 shows the ply line insert 37 which is employed in the preferred embodiment. It may be located interior to the tire innerliner 36 as shown in the drawing or between the liner 36 and the ply line 34.

Figure 3:
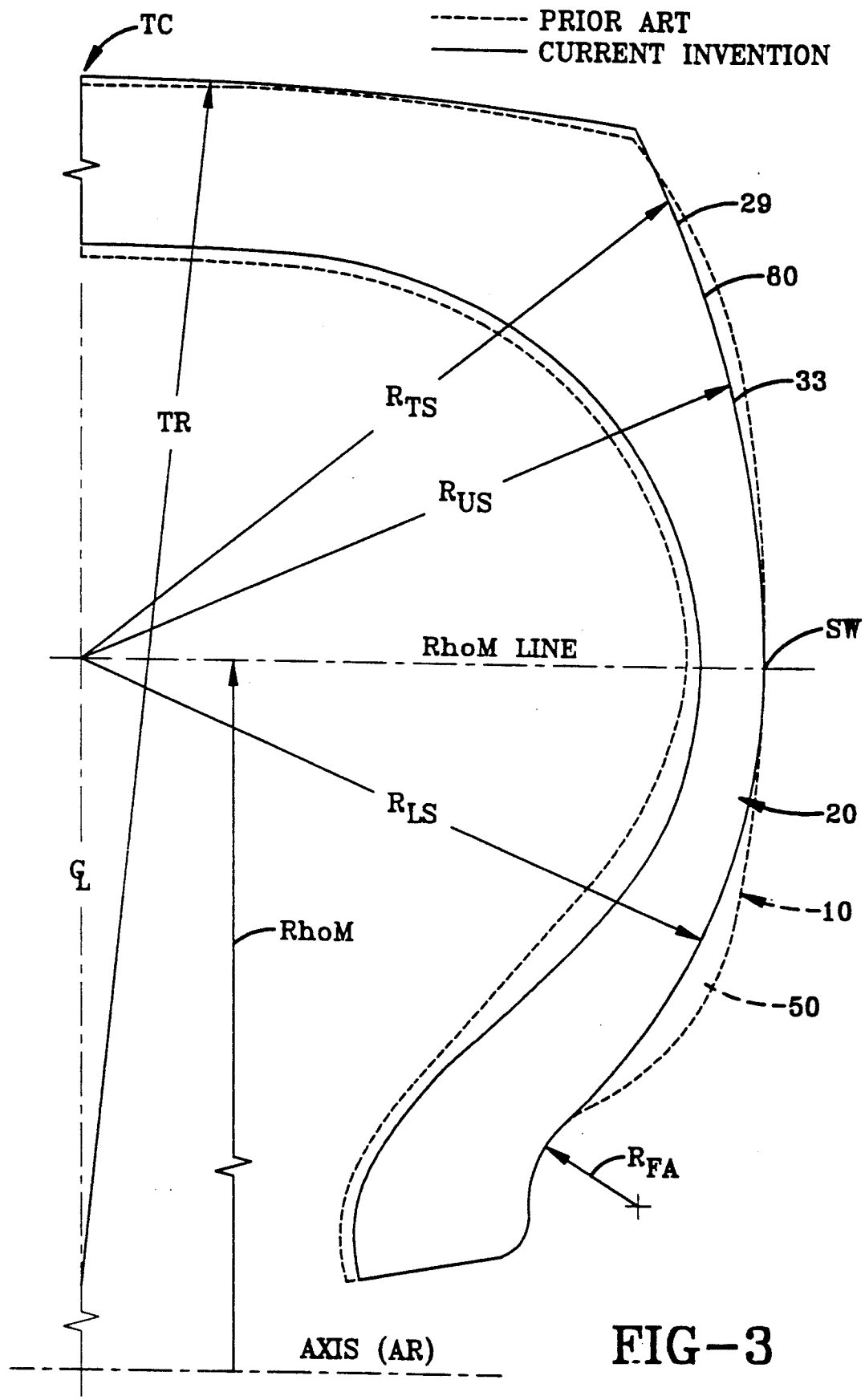
FIG. 3 is a view of one half of the exterior surfaces of the unmounted uninflated tire of FIG. 1 (represented by dashed lines) and the tire of FIG. 2 (represented by solid lines), it being understood that the opposite half of the tires are similar to the illustrated portions.

FIG. 3 shows exterior surface 80 of the current invention overlaid against the prior art for this particular size tire. The current invention tire 20 has no flat at the tread centerline TC, while prior art does. The current invention shows a narrower as molded shape in the radially upper sidewall and radially lower sidewall. The lower sidewall is defined by a single sidewall radius $R_{ls}$ blended tangentially to the flange radius $R_{fa}$. The current invention does not have the compound radii in the lower sidewall which results in the characteristic "bulge" 50 of the prior art earthmover tire 10. The axially outer ends 29 of the tread 24 at the tread shoulder have a curvature $R_{ts}$ which is an extension of the curvature of the upper sidewall $R_{us}$. The resultant the flange radius $R_{fa}$.

The flange area radius $R_{fa}$ is defined to have no interference with the rim flange to which the tire will be mounted. It is desirable to have between 2 mm (0.08 inches) and 3 mm (0.12 inches) of clearance. The preferred embodiment has a 2.5 mm (0.1 inch) clearance from the rim flange at the flange tangency point.

The preferred embodiment features a single steel ply 34 with 0 to 4 chippers 31,32, but may have as many as six chippers for very large sizes.

The actual radii and tangency points are defined geometrically from specific tire envelope and construction parameters. The design requires the following data prior to defining the geometry: Bead size, tread centerline depth required and gauges of all components at the tire centerline. The maximum section width (SW) and outside diameter (OD) are determined, as is the tire bead size and dimensions, according to conventional methods. Then RhoM is defined by finding the center point between the ply line bead pivot point (45 degrees from the bead center at the ply line centerline) and the ply line centerline at the tire radial centerline. To calculate Rhom, one must first locate two points on the tire: the ply line pivot point (P) and the ply line center point (C).

The ply line pivot point (P) is located at the intersection of the ply line centerline and a line (Lp) drawn at an angle $\theta$ of 45° relative to the axis of rotation and extending from the bead center.

The ply line center point (C) is located at the ply line centerline at the cross-sectional centerline (CL). In the preferred embodiment, this point is located at the cross-sectional centerline (CL) at the minimum gauge (MG) to the top of the reinforcing ply plus one-half of the ply gauge. The minimum gauge (MG) is determined for a given tire by summing the following: 1) desired tread depth; 2) required undertread gauge; 3) reinforcing belt gauges; 4) any insulating gum layers between the above components; and 5) one-half the thickness of the ply 34.

A line extending between these points defines the line PC. At the midpoint of the PC line, parallel to the axis of rotation is the RhoM line. The distance from the tire's axis of rotation (AR) and the RhoM line is RhoM (or the midline radius).

Tread arc width (TW) and shoulder drop are defined using traditional methods. A single tread arc radius (TR) is defined connecting the shoulder point and max OD at the tire centerline. The belt 40 curvature is then established as parallel to the tread arc width by fixing the tread radius as molded a fixed distance above the belt reinforcement radius of curvature. This distance is equal to the minimum tread 25 and undertread 27 depth required. In the preferred embodiment the tread 25 depth or radial height is constant across the tread width.

The ply line is located at the minimum centerline gauge at the tire centerline. From this data, the RhoM line can be determined. The upper sidewall curve $R_{us}$ is then defined as originating on the RhoM line at the print that passes through the shoulder point and the maximum section width (SW) equidistantly. In the present invention, the RhoM line is coincident with the maximum section width's radial location.

The flange radius $R_{fa}$ is then defined to insure the preferred clearance from the rim flange at the tangency point. This point is determined iteratively by the following steps: 1) Select a radius that gives 2.5 mm (0.7) clearance at the 45 degree point from the flange radius; this radius must originate on the diameter line passing through the flange radius centerline; 2) define the lower sidewall curve such that it originates on the RhoM line and "ends" tangent to the flange area radius $R_{fa}$; 3) measure the clearance to the rim flange at the resulting tangency point; 4) enlarge or decrease flange area radius as indicated and reiterate the lower sidewall radius; and 5) repeat as necessary to achieve preferred rim-tire clearance.

The natural ply line is then developed incorporating the centerline radius resulting from the conventional gauges between the lower belt and the ply line, the determined RhoM and the measured ply line pivot point P.

Tires incorporating these construction features and molded according to the preferred embodiment have demonstrated improved high speed and durability characteristics. These benefits are felt to derive from the lower than traditional RhoM, which better divides the tire work during load cycles. Typically RhoM for the 445/95R25 prior art earthmover tire is about 12 mm to 20 mm (0.5 to 1.0 inches) farther away from the bead than the present invention tire's RhoM. In the preferred embodiment, the RhoM line is about 21 cm (8.33 inches) above the nominal rim diameter. Plus, the preferred embodiment allows for a lighter construction and minimal gauges due to a lack of geometric stress risers.

A tire made according to the present invention in a size 445/95R25 has a rated load carrying capability of 7300 Kg at 70 KM/hr when inflated to 9 bars of cold inflation pressure. A similar prior art tire of the 1600R25 size identified as the GP-2B tire had a rated load carrying capability 7300 Kg at only 50 KM/hr when inflated to 9.0 bar cold inflation pressure.

Eight 445/95R25 tires made according to the present invention were mounted to a 4-axle mobile crane PPM680-ATT (330 hp) and inflated to a 9.00 bar cold inflation pressure. The total vehicle weight was 51,275 Kg. Each tire had five temperature probes positioned about the tire. The vehicle was then driven on a heat-rise test comprising four segments as shown in the table below:

|  | Segment 1 | Segment 2 | Segment 3 | Segment 4 |
| --- | --- | --- | --- | --- |
| Time | 58 | 55 | 88 | 40 |
| Avg. Speed | 63 | 70 | 66 | 59 |
| Distance | 61 | 64 | 97 | 39 |
| Max. Temp |  |  |  |  |
| Tire 1 | 61 | 72 | 78 | 74 |
| Tire 2 | 57 | 71 | 79 | 74 |
| Tire 3 | 58 | 76 | 80 | 78 |
| Tire 4 | 78 | 95 | 107 | 101 |
| Tire 5 | 56 | 69 | 71 | 70 |
| Tire 6 | 56 | 72 | 70 | 69 |
| Tire 7 | 64 | 82 | 84 | 80 |
| Tire 8 | 65 | 80 | 80 | 78 |

The tires all performed well. It was observed that tire #4 had a construction non-uniformity which was believed to contribute to the higher running temperature at one shoulder location. At the opposite shoulder of tire #4, the temperature reading was 80° C. when the recorded max of 107° C. was achieved. The non-uniformity of tire #4 was determined to be due to a slightly thicker undertread at the location of the probe. This thicker undertread resulted in a stress riser condition at that shoulder location. As the data indicates, the present invention tire is capable of operating at high speeds for extended periods of time. The prior art tire (1600R/95GP-2B) simply could not be tested at these high-speed duration cycles or segments due to the heat generated.

Remarkably, the absence of the flats and bulges in the sidewalls has resulted in a substantially cooler running tire. The loss of these structural enhancing stress risers has not weakened the load carrying capability of the tire. The current invention tire can carry the same rated load at substantially higher speeds.

It is believed that a tire developed and molded to the present invention yields a more energy efficient tire than prior art.

What is claimed:

1. A pneumatic tire, the tire in its unmounted and uninflated state, having a nominal bead diameter of at least 50 cm (20 inches), a carcass having a pair of bead portions, each bead portion having one annular inextensible bead and a bead flange area, the carcass further including a steel-reinforced radial ply extending between and wrapped about each bead, the ply having turn up ends extending axially and radially outwardly from each bead, and a plurality of reinforcing belts disposed radially outwardly of the ply; a tread disposed radially outwardly of the carcass, the tread having a net-to-gross ratio in the range of 40% to 60%; a pair of axially inner sidewalls disposed between the ply and the turn up end of the ply and extending from the bead portion to the reinforcing belts; and a pair of axially outer sidewalls extending radially inwardly from the tread along the axially outer surfaces of the carcass and the inner sidewalls toward the beads, the uninflated and unmounted tire being characterized by:

the tread having a radially outer ground contacting surface that has a continuous curvature in the axial direction, such curvature being defined by a radius or radii less than twice the nominal bead diameter;

the axially outer sidewalls having axially outer convex surfaces extending from the tread radially outer ground contacting surface to the bead flange area, the convex surfaces having a curvature in the radial direction, such curvature being defined by a radius or radii less than the nominal bead diameter; and the tread having axially outer convex surfaces, being an extension of the convex surface of the sidewall.

2. The pneumatic tire of claim 1 wherein the radially outer ground contacting surface of the tread has a substantially constant radial height across the tread width measured as a fixed distance above the plurality of reinforcement belts.

3. The pneumatic tire of claim 2 wherein the plurality of reinforcing belts has a radius of curvature parallel to the curvature of the tread at the line tangent to the ground contacting surface.

4. The pneumatic tire of claim 1, further characterized by an outer shape wherein each sidewall has an outer surface composed entirely of curves connected at tangency points around the cross section of the tire.

5. The pneumatic tire of claim 4 wherein the outer shape consists of five curves, one curve defining the tread arc width, a second curve defining a tread shoulder region of the tire, a third defining an upper sidewall, a fourth defining a lower sidewall, and a fifth defining a flange radius.

6. The pneumatic tire of claim 1 wherein the carcass includes a single steel reinforced radial ply extending between and wrapped around each bead and wherein the tire having a size designation 445/95 R25 has an RhoM line about 21 cm (8.33 inches) above the nominal bead diameter, said RhoM line being defined as a line parallel to the axis of rotation of the tire and passing through the midpoint of a line extending between a plyline centerpoint (c) and a plyline pivot point (p), the plyline centerpoint (c) being located on a plyline of the radial ply at a cross sectional centerline of the tire, the plyline pivot point (p) being located at the intersection of a line (lp) oriented 45° relative to the axis of rotation of the tire and extending radially outward and axially inward from each bead center and a plyline of the radial ply where wrapped around each bead.

* * * * *